US010509636B2

(12) United States Patent  
Laurence et al.

(10) Patent No.: US 10,509,636 B2  
(45) Date of Patent: Dec. 17, 2019

(54) SYSTEM, METHOD AND PERSONALIZABLE PORTABLE DEVICE IN WHICH APPLICATION CODE LIBRARIES ARE DISTRIBUTED IN A COMPRESSED FORM

(71) Applicants: GEMALTO SA, Meudon (FR); STEPNEXUS LTD, Kelvin Close, The Links, Birchwood, Warrington Cheshire (GB)

(72) Inventors: Sterling Laurence, Warrington (GB); Antony Jeffreys, Cambridgeshire (GB)

(73) Assignee: Thales Dis France SA, Meudon (FR)

( * ) Notice: Subject to any disclaimer, the term of this patent is extended or adjusted under 35 U.S.C. 154(b) by 663 days.

(21) Appl. No.: 15/105,562

(22) PCT Filed: Dec. 3, 2014

(86) PCT No.: PCT/EP2014/076427  
§ 371 (c)(1),  
(2) Date: Jun. 17, 2016

(87) PCT Pub. No.: WO2015/090969  
PCT Pub. Date: Jun. 25, 2015

(65) Prior Publication Data  
US 2016/0321053 A1    Nov. 3, 2016

(30) Foreign Application Priority Data

Dec. 17, 2013    (EP) .................................... 13250128

(51) Int. Cl.  
*G06F 8/61*      (2018.01)  
*G06F 16/174*     (2019.01)  
*G06Q 20/34*      (2012.01)

(52) U.S. Cl.  
CPC ............ *G06F 8/61* (2013.01); *G06F 16/1744* (2019.01); *G06Q 20/3558* (2013.01); *G06Q 20/3574* (2013.01)

(58) Field of Classification Search  
None  
See application file for complete search history.

(56) References Cited

U.S. PATENT DOCUMENTS 8,149,148 B1 *   4/2012   Allen .................... H03M 7/707  
                                                                           341/106  
2007/0150891 A1    6/2007   Shapiro  
(Continued)

OTHER PUBLICATIONS

PCT/EP2014/076427, International Search Report, dated Feb. 2, 2015, European Patent Office, P.B. 5818 Patentlaan 2 NL—2280 HV Rijswijk.

(Continued)

*Primary Examiner* — Wilson Lee  
(74) *Attorney, Agent, or Firm* — The Jansson Firm; Pehr B. Jansson

(57) ABSTRACT

A method for manufacturing a personalizable portable electronic device having a 0.libraries as well as a corresponding portable electronic device and personalization system. The method includes a step of storing a plurality of compressed application code libraries in the non-volatile memory a step of determining which application code libraries are not required for applications used on the personalizable portable electronic device, a step of deleting from the non-volatile memory any compressed application code libraries determined to not be required for applications used on the personalizable portable electronic device, and a step of decompressing an application code library required by an application used on the personalizable portable electronic device. Other systems and methods are disclosed.

6 Claims, 12 Drawing Sheets

(56) References Cited

U.S. PATENT DOCUMENTS

| | | | |
|---|---|---|---|
| 2008/0134043 A1* | 6/2008 | Georgis | H04N 7/10 |
| | | | 715/733 |
| 2009/0222473 A1* | 9/2009 | Chowdhury | G06F 17/30961 |
| 2010/0223342 A1* | 9/2010 | Brown | H04L 63/20 |
| | | | 709/206 |
| 2013/0066443 A1* | 3/2013 | Kerr, III | G05B 19/0423 |
| | | | 700/19 |
| 2013/0138718 A1 | 5/2013 | Mallur et al. | |
| 2014/0025839 A1* | 1/2014 | Marko | H04H 20/42 |
| | | | 709/231 |
| 2015/0126142 A1* | 5/2015 | Meredith | H04B 1/04 |
| | | | 455/127.2 |
| 2015/0326518 A1* | 11/2015 | Li | H04W 4/12 |
| | | | 709/206 |

OTHER PUBLICATIONS

PCT/EP2014/076427, Written Opinion of the International Searching Authority, dated Feb. 2, 2015, European Patent Office, D-80298 Munich..

* cited by examiner

SYSTEM, METHOD AND PERSONALIZABLE PORTABLE DEVICE IN WHICH APPLICATION CODE LIBRARIES ARE DISTRIBUTED IN A COMPRESSED FORM

BACKGROUND OF THE INVENTION

The present invention relates generally to manufacture of portable electronic devices, and more particularly to provisioning of multiple application code libraries in a compressed form for subsequent decompression for use by applications activated on the portable electronic devices, for example, integrated circuit cards primarily using non-volatile memory for program storage.

The present technology is described herein as related to smart cards (also known as integrated circuit cards, UICC, SIM, chip cards), which are small card-like electronic devices with embedded integrated circuits and memory. Smart cards have evolved significantly over time. One recent development is the increased use of flash memory, in lieu of Read-Only Memory (ROM), for program and data storage. Herein, the term non-volatile memory is used to describe memory systems that retain their stored content through power cycles and which may be reprogrammed Examples, include Electrically Erasable Programmable ROM (EEPROM) and flash memory.

The life of a smart card, from initial manufacture to ultimate disposal, is often described as the smart card life cycle. While there is no fixed life cycle model that applies to all cards and all deployments, there are certain common aspects. In a first phase, manufacturing, the smart cards are manufactured in bulk. This includes production of a card body, production of chips and contacts, and assembly of these into one structure. The production phase may also include pre-loading of operating systems, application code libraries, and certain static applications common to all cards of a family. Thus, the manufacturing phase involves several sub-steps; these include manufacturing of chip modules, printing of card bodies, and assembly of cards by embedding the chip modules into the card bodies. The chip module manufacturer and the card manufacturer may be separate entities.

Smart cards are in a sense the most personal of computers. A smart card may, for example, have embossed a user's name and likeness thereon and may contain personal information relating only to the user, e.g., the user's account information. Thus, a second phase in the life cycle is the personalization, also known as individualization, stage. During personalization, specific applications used by an individual user may be loaded onto the smart card. Such applications may require particular application code libraries to have been pre-loaded onto the smart card.

After personalization, the card may be issued to an end-user.

Let's consider an example including an issuing bank. The bank (issuer) would purchase a large number of cards from a card manufacturer. The issuer may use these cards with many applications; for example, in the banking context there may be applications for payment service companies such as VISA, Master Card, Eurocard, JCB Card, etc., specific financial institutions such as American Express, or payment applications provided by card manufactures such as the PURE payment application from Gemalto, N.V., Amsterdam, The Netherlands. Each of these applications requires a particular application code library, e.g., VISA application code library, Amex application code library, and so on. A card family is a card that contains a particular combination of code libraries.

Typically a given card is not used for all different applications, e.g., a VISA application may not co-exist on a card with a JCB Card application. Therefore, in the interest of cost savings achieved by having smaller NVM, it is not necessary to provide memory space to include all application code libraries. However, a drawback to that is that an issuer, e.g., the bank issuing cards to its customers, must order and maintain multiple card families, e.g., one card family for each of its applications. Managing multiple card families is expensive and cumbersome for the issuer; for example, if the issuer orders too many cards of one family, those cards may not be used with an incompatible application.

From the foregoing it will be apparent that there is still a need for an improved method to provide smart cards that provide for multiple application code libraries without requiring excessively large non-volatile memories that include code libraries not used after personalization of the cards.

DETAILED DESCRIPTION OF THE INVENTION

Figure 1:
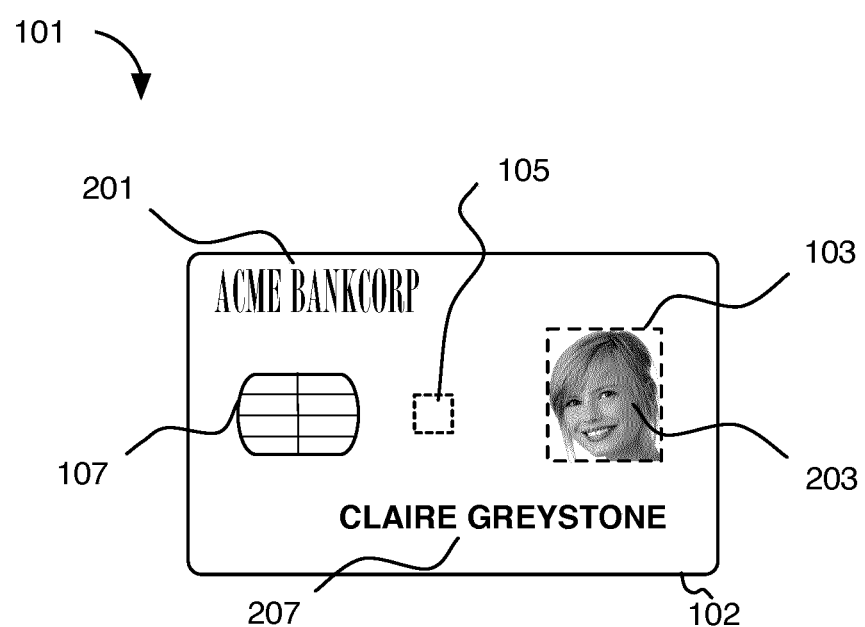
FIG. 1 is a diagram illustrating an integrated circuit card including certain visual personalization features.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A technology is presented herein that provides an improved method for distributing application code libraries on integrated circuit cards. The improved method provides for compression of multiple application code libraries during manufacturing of the integrated circuit cards and a subsequent decompression of the compressed application code libraries that are used by applications loaded during personalization thereby allowing for one card family to support many more applications than would be possible otherwise.

FIG. 1 is a top-view of an integrated circuit card 101, for example, a smart card. Briefly, a manufacturer may provide the integrated circuit card 101 in a bulk form; that is without personalization features identifying an issuer, e.g., a bank, or the customer to which the card is provided. In its pre-personalization form, the integrated circuit card 101 typically encompasses a plastic substrate 102 on which an image area 103 is provided. The integrated circuit card further includes an embedded integrated circuit card chip 105, which is typically connected to a contact pad 107. In alternative embodiments, the integrated circuit card chip may connect to external readers using connectors such as Universal Serial Bus (USB) connectors or wirelessly using techniques such as near-field communication (NFC) or radio-frequency identification (RFID) protocols.

During personalization of the integrated circuit card 101, physical identifying information may be added to the card, e.g., the issuer's logo 201, a photograph 203 of the customer to which the integrated circuit card is issued to, and the customer's name 207. While these are mere visual manifestations of the personal nature of the integrated circuit card 101, they are indicative of the personal nature of each individual card. The issuer also personalizes the specific integrated circuit card 101 assigned to a customer by storing information pertinent to that customer and with applications that the user can execute using the card 101 in non-volatile memory of the card.

Figure 2:
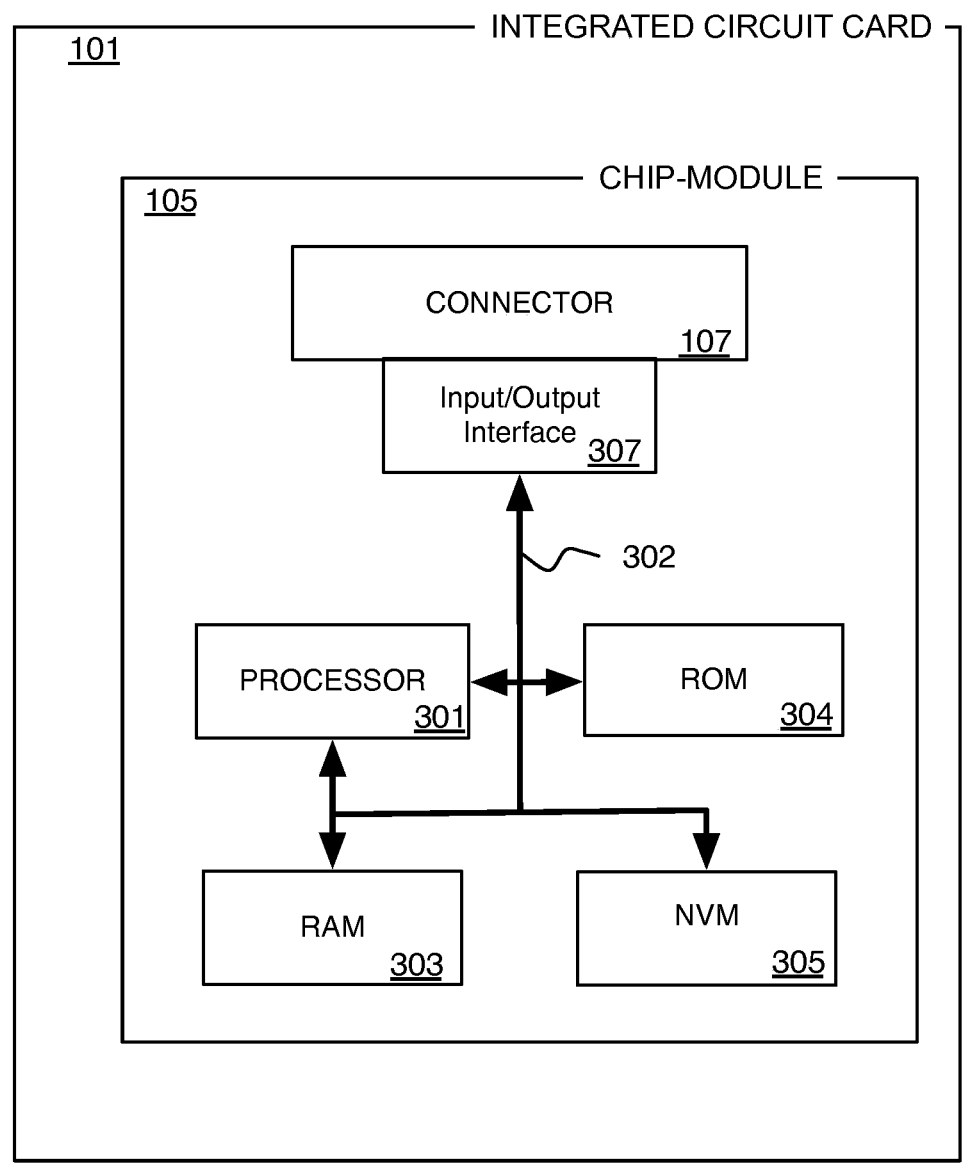
FIG. 2 is a block diagram illustrating a high-level view of the architecture of an integrated circuit card of FIG. 1.

FIG. 2 is a schematic illustration of the hardware architecture of an integrated circuit card 101, specifically, the chip-module 105 of an integrated circuit card 101. The chip-module 105 may include a processor 301 connected via a bus 302 to a random access memory (RAM) 303, a read-only memory (ROM) 304, and a non-volatile memory (NVM) 305. The chip-module 105 further includes an input/output interface 307 for connecting the processor 301, again typically via the bus 302, to the connector 107 by which the integrated circuit card 101 may be connected to a card reader. As noted above, the integrated circuit may alternatively connect to the outside world wirelessly and would in such embodiments typically include an antenna rather than the connector 107.

The ROM 304 may or may not be present. Herein is described a technology in which much of the functionality that has hitherto been placed in ROM is now located in the NVM 305. However, that does not preclude that the integrated circuit card 101 has a ROM for some other purpose.

Figure 3:
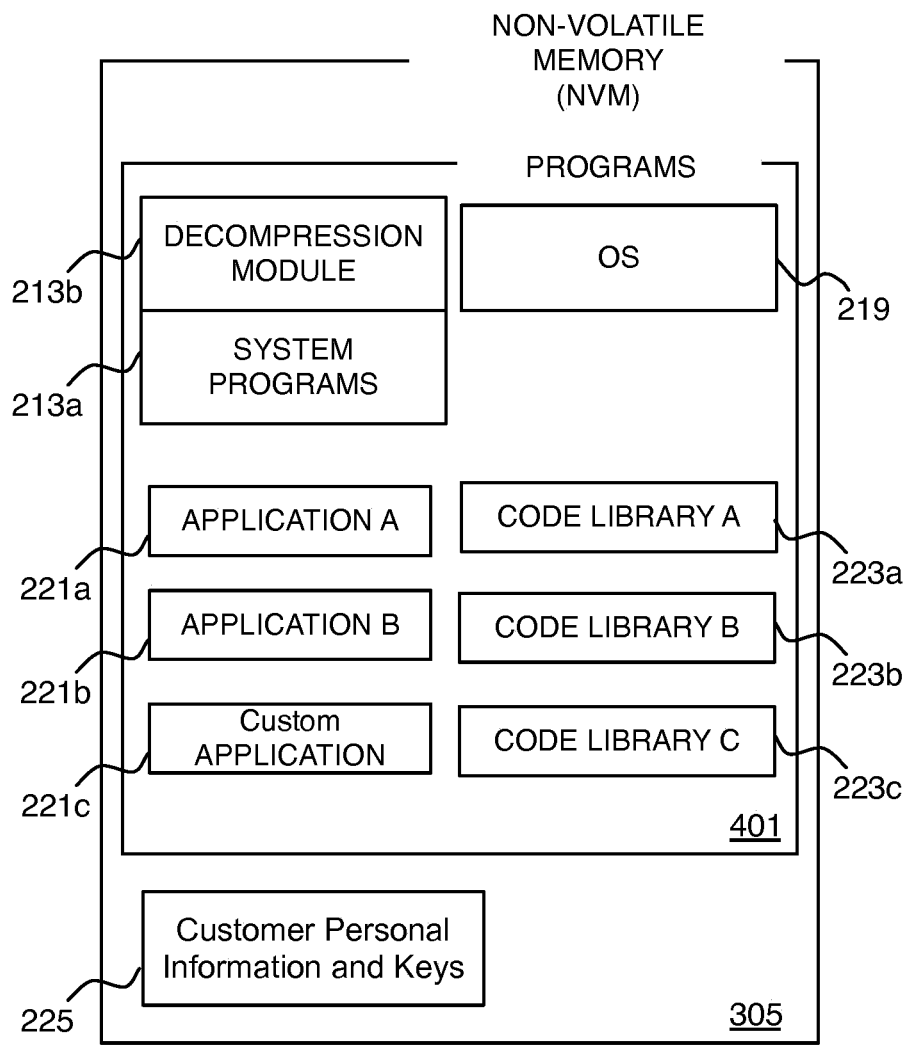
FIG. 3 is a block diagram illustrating the architectural organization of programs and other data stored in a non-volatile memory of the integrated circuit card of FIG. 2, including illustrating application programs and application code libraries.

The NVM 305 may include computer programs 401 as is illustrated in FIG. 3. While it is here depicted that the computer programs 401 are all co-located in the NVM 305, in actual practice there is no such restriction as programs may be spread out over multiple memories and even temporarily installed in RAM 303. Furthermore, the integrated circuit card 101 may include multiple NVMs. The programs 401 include operating system programs as well as application programs loaded on to the integrated circuit card 101.

The integrated circuit card 101 programs 401 may include the operating system OS 219 and a decompression module 213b (the role of which is described in greater detail below) as well as other system programs 213a, e.g., cryptography, user authentication, and communications modules. The system programs 213a may include functionality of the integrated circuit card 101 required to perform the methods described herein.

The integrated circuit card 101 programs 401 may further include one or more applications 221 (e.g., 221a and 221b) for causing the integrated circuit card 101 to perform various tasks associated with the integrated circuit card 101. These applications may be applications associated with particular payment products, e.g., as provided by financial service corporations such as Visa Inc. of Foster City, Calif., MasterCard Incorporated of Purchase, N.Y., American Express Company of New York, N.Y., or Japan Credit Bureau (JCB) of Tokyo, Japan. The application programs 221 may also include custom application 221c provided by the card issuer, e.g., the PURE payment application provided by GEMALTO, N.V., Amsterdam, The Netherlands.

The applications 221 may be loaded onto the integrated circuit card 101 when the issuer personalizes the integrated circuit card 101 for a specific customer. Typically the applications 221 make calls to functions stored in application code libraries 223. In FIG. 3, the application code libraries 223 are depicted as a one-to-one match to applications 221, e.g., for Application A 221a there is a corresponding application code library A 223a, and so on. However, in alternative embodiments, there is no requirement for such one-to-one correspondence between applications 221 and application code libraries 223; more than one application may share one application code library 223 and, conversely, one application may rely on functions present in more than one application code library 223.

Thus, the personalization stage, introduced in conjunction with FIG. 1, further includes personalizing the electronics of the integrated circuit card 101 by loading the applications 221 that are appropriate for the particular customer to which the integrated circuit card 101 is to be issued. That personalization further includes storing customer personal information 225 pertinent to the customer in the NVM 305. Such personal information 225 may include account information, cryptography keys, and customer identifying information.

Figure 4:
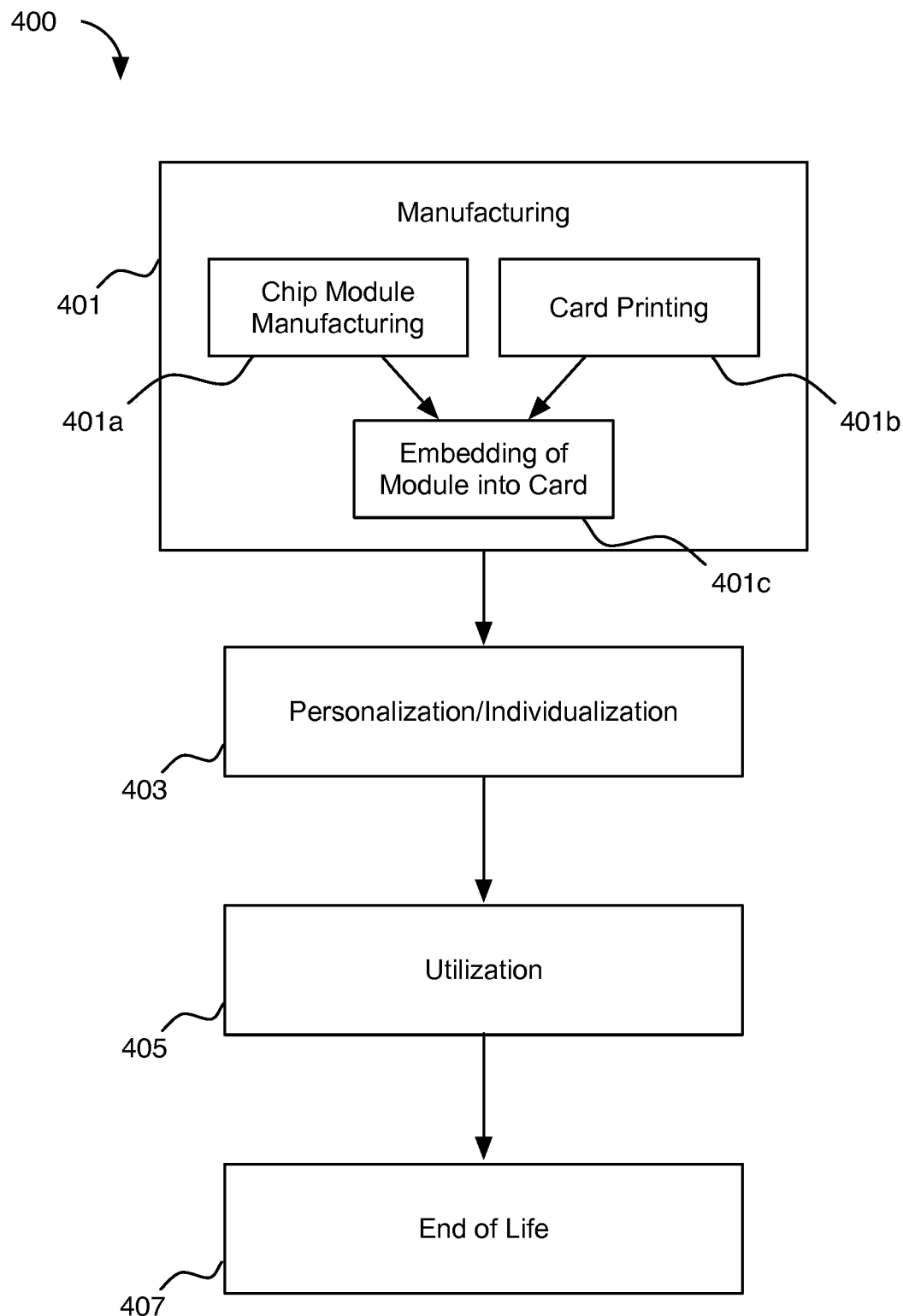
FIG. 4 is a flow chart illustrating the major stages of a life cycle of an integrated circuit card.

The stages of card manufacturing and personalization are stages of the overall life cycle of an integrated circuit card 101. FIG. 4 illustrates the overall flow of the integrated circuit card 101 life cycle 400. The first stage is the manufacturing stage 401 in which the physical structure of the integrated circuit card 101 is created by the card manufacturer. The manufacturing stage 401 consists of several sub-steps: chip-module manufacturing 401a, card printing 401b, and the embedding of the chip-module into the card 401c.

The manufacturing stage 401 also includes installing in the card system programs such as the operating system 219, code libraries 223, and system programs such as the decompression module 213b as well as other system programs 213a, e.g., cryptography and authentication. Typically these steps are performed as part of the chip-module manufacturing step 401a. The chip-module 105 may then be provided to a card manufacturer for embedding into a printed card stock, step 401c. At the conclusion of the manufacturing stage, all cards in a card family are similar to one another; differences may include serial numbers, unique cryptographic keys associated with a particular card. However, system programs such as OS 219 and code libraries 223 would typically be the same over one manufacturing run.

The next stage of the integrated circuit card life cycle is personalization stage 403. As discussed hereinabove the personalization stage (also known as individualization) involves personalizing the visual aspects of the integrated circuit card 101 by printing names, logos, photographs, etc. on the exterior surfaces of the integrated circuit card 101. During the personalization stage 403, the memory of the integrated circuit card 101, e.g., the NVM 305, is loaded with data associated with a particular individual, e.g., name, account numbers, keys, personal data, as well as any applications 221 that the customer associated with the integrated circuit card 101 will execute on the integrated circuit card 101. Further, the personalization stage 403 may include cleaning up the memory, e.g., the NVM 305, by removing any programs or data that are not needed during the use of the integrated circuit card 101.

The present technology particularly pertains to the manufacturing stage 401 and personalization stage 403 of the integrated circuit card 101 life cycle 400. The remaining the integrated circuit card 101 life cycle 400 stages are the utilization stage 405—in which the integrated circuit card 101 is issued to a customer and during which the customer makes use of the card—and the end of life stage 407 in which the card is taken out of use.

While the present technology is primarily intended for execution during the manufacturing 401 and personalization 403 stages, certain customization of an integrated circuit card 101 could be performed after issuance of an integrated circuit card 101 to a customer. Thus, it is possible that the techniques described below would be performed during an early part of the utilization stage 405, for example, as part of activating a card after issuance to a customer.

Figure 5:
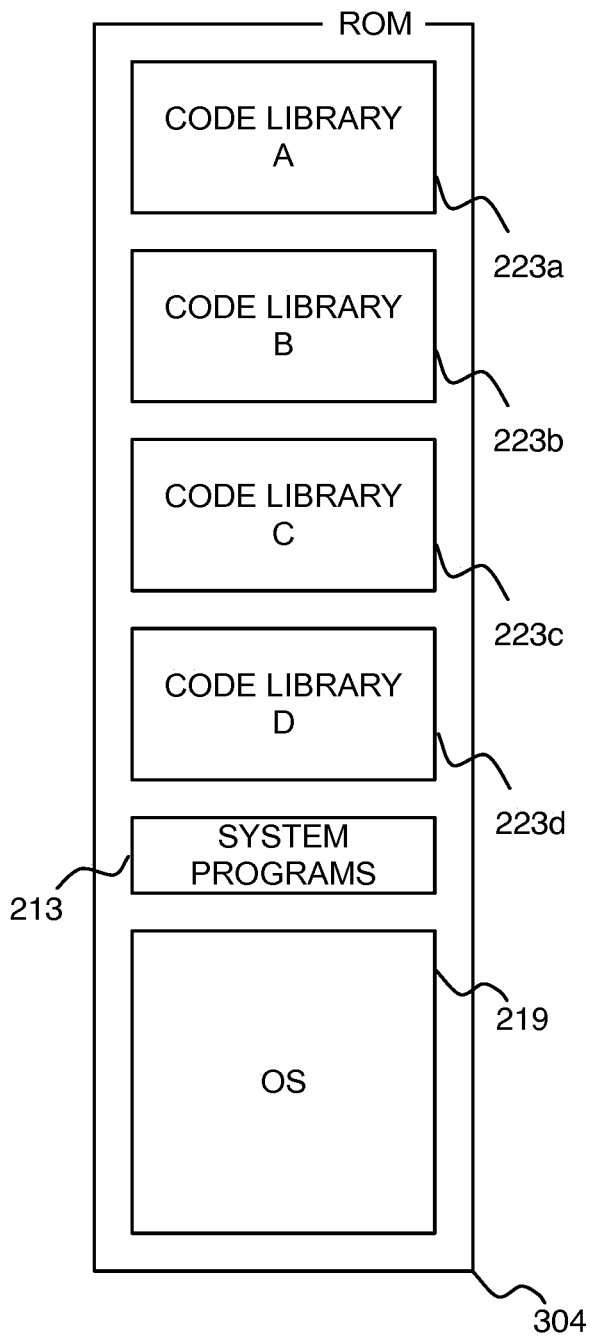
FIG. 5 is a block diagram illustrating a prior art example of a read-only memory in which multiple application code libraries have been stored to allow an integrated circuit card to support applications that use any of these application code libraries.

Historically, integrated circuit cards would have relatively large read-only memories 304, e.g., as illustrated in FIG. 5. These memories would include the operating system 219, system programs 213, as well as all application code libraries 223 that possibly could be linked to by application programs that would be loaded during personalization. As a read-only memory there would not be the possibility for making any changes to the contents of the ROM 304 during personalization. However, ROM is relatively inexpensive. Therefore, it would not be considered a large problem to include application code libraries 223 that would not be used.

Figure 6:
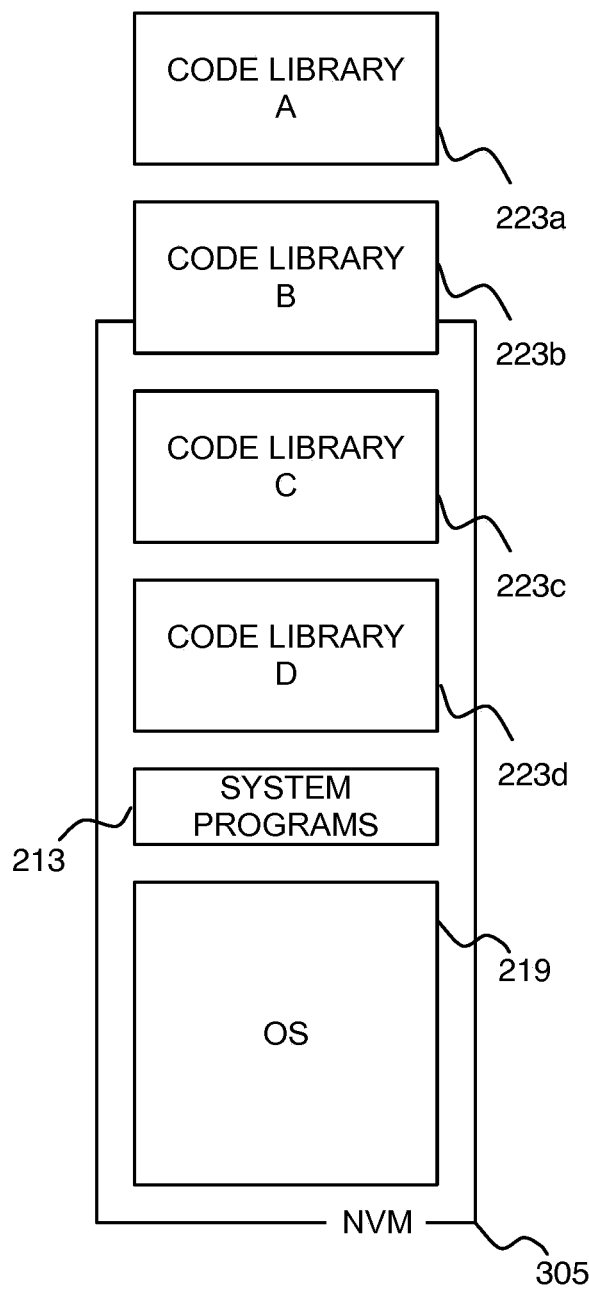
FIG. 6 is a block diagram illustrating an example scenario in which a non-volatile memory of an integrated circuit card is too small to store all the application code libraries stored in the ROM of FIG. 5.

Recently it has become increasingly common that integrated circuit cards rely on NVM 305 for storing programs and data. Non-volatile memory has the advantage vis-à-vis ROM of providing increased flexibility in terms of the data stored thereon; it is possible to add programs, delete programs, update programs, update data stored etc. However, NVM is more expensive than ROM. Therefore, it is often the case that the total storage provided is not as large or not large enough to store application code libraries 223 for all applications that an issuer would be issuing cards for. FIG. 6 illustrates the situation in which several code libraries 223 cannot fit within the limited address space of NVM 305.

Figure 7:
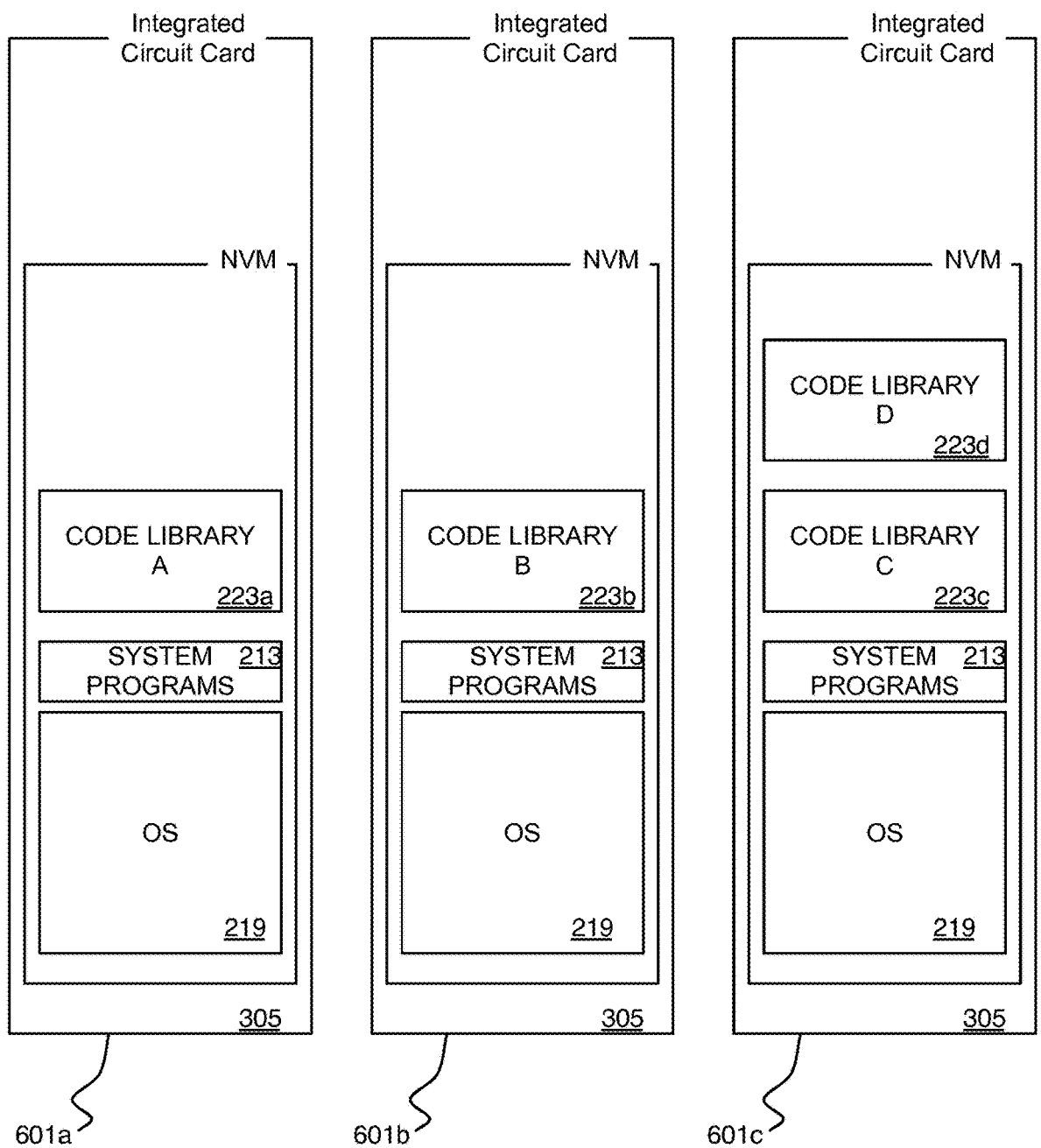
FIG. 7 is a block diagram illustrating an example scenario in which multiple integrated circuit card families are used to support the application code libraries stored in the ROM of FIG. 5.

The reduced address space of an NVM 305 that fails to include sufficient storage space for all application code libraries 223 can be solved by a manufacturer and issuer by having multiple integrated circuit card families, also known as variants, as is illustrated in FIG. 7; a first card family 601a contains the code library 223a, a second card family 601b contains the code library 223b, and a third card family 601c contains the code library 223c and the code library 223d. While maintaining multiple card families 601 solves the problem of the NVM 305 being of insufficient size to accommodate all the code libraries 223, maintaining multiple card families adds costs and management complexities for issuers, e.g., maintaining multiple inventories, providing maintenance and support for multiple card families. For example, it increases the effort required to make sure the correct module with required application is embedded into each printed card.

Figure 8:
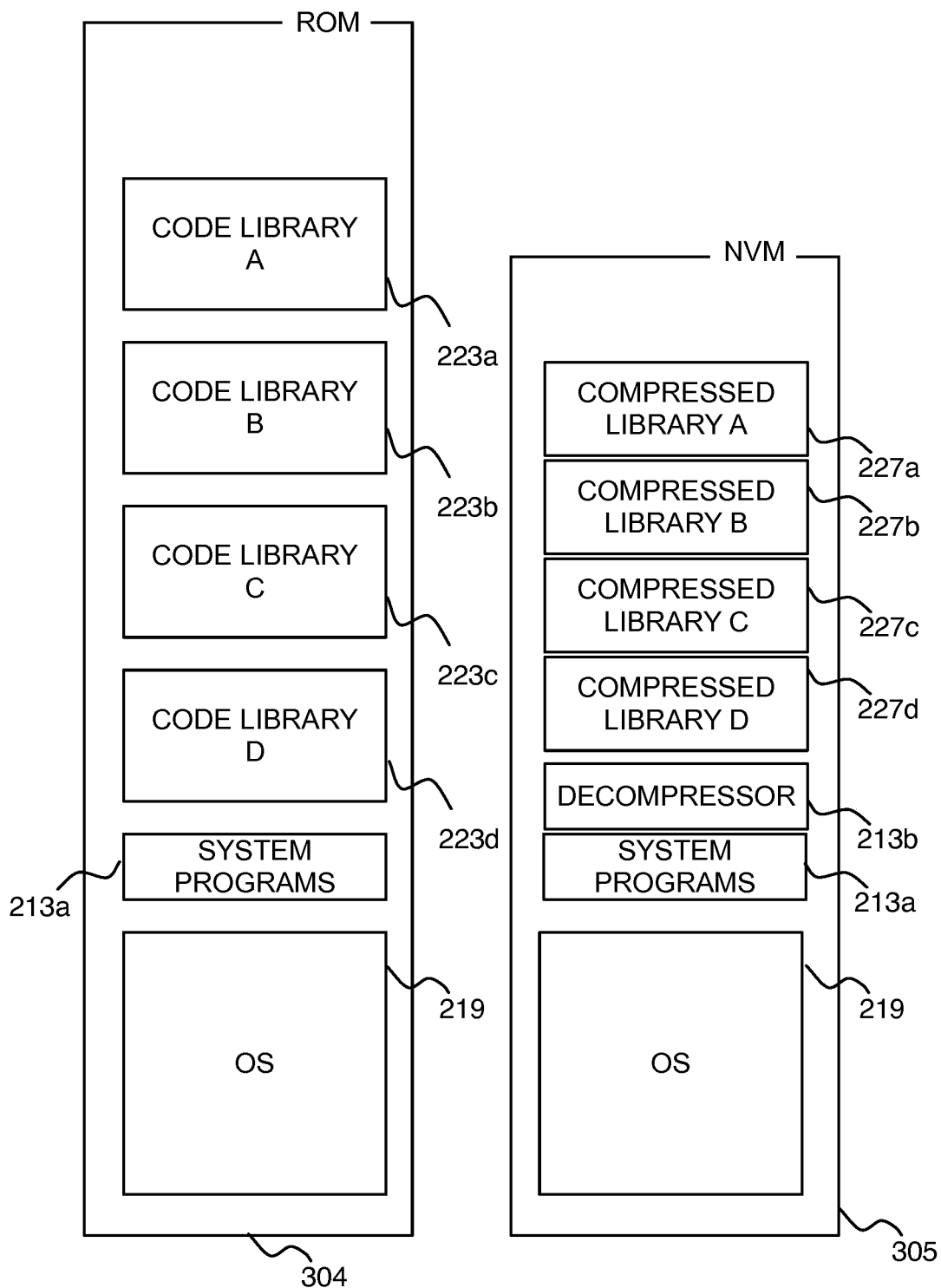
FIG. 8 is a block diagram illustrating an embodiment in which compressed versions of the application code libraries of the ROM of FIG. 5 are stored in the non-volatile memory of an integrated circuit card thereby allowing an NVM-based integrated circuit card to support more applications than any one of the integrated circuit card families of FIG. 7.

In a preferred embodiment, illustrated in FIG. 8, the limited size of the NVM 305 is addressed by installing compressed code libraries 227 into the NVM 305. During the manufacturing stage 401 the code libraries 223 are compressed off card and the corresponding compressed code libraries 227 are loaded into the NVM 305. While not drawn to scale, FIG. 8 illustrates that NVM 305 is smaller in size than ROM 304 which was sufficiently large to store the code libraries 223 without compressing these. The manufacturing stage may use a compression technique suitable for use on an integrated circuit card 101. Such compression techniques are described in J. F. Dhem, et al., *Lossless Compression Algorithms for Smart Cards: A Progress Report*, Technical Report, UCLCRYPTO GROUPE, CG-1996/7, Published in Proc. CARDIS'96, Amsterdam, The Netherlands, Sep. 16-18, 1996 (the entire disclosure of which is incorporated herein by reference).

In a preferred embodiment, a corresponding decompressor 213b is also loaded into the NVM 305 of the chip-module 105 during the chip-module manufacturing stage 401a.

Figure 9:
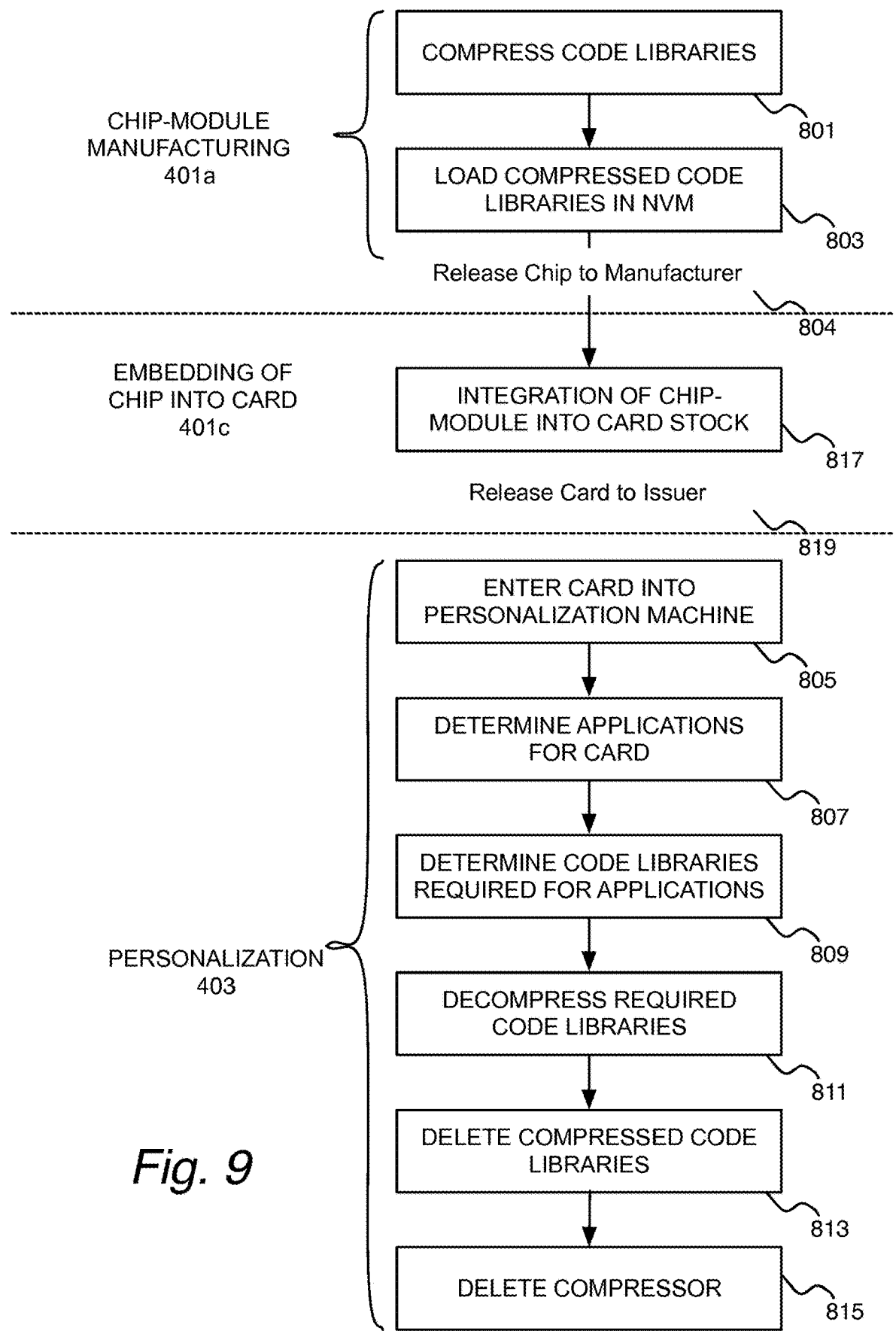
FIG. 9 is a flow chart illustrating the steps of the manufacturing and personalization stages of the integrated circuit card life cycle to allow for distribution of integrated circuit cards with compressed code libraries.

FIG. 9 is a flow-chart illustrating the process of producing compressed code libraries during the chip-module manufacturing stage 401a and decompressing these code libraries during the personalization stage 403. Naturally, the manufacturing stage 401 and personalization stage 403 contain many other steps that are unrelated to and outside the scope of the technology presented herein.

Step 801, performed during the manufacturing stage 401: the code libraries are compressed. The compression should be performed using a compression technique suitable for use with integrated circuit cards. One criteria in selecting a compression technique is to ensure that the compression is sufficiently effective that the size difference between the compressed code and the uncompressed code is sufficiently large to make up for the size of the decompressor 213b. Conversely, the compression technique should be simple enough that the decompressor 213b can be small enough to not offset the amount of compression achieved. In an alternative embodiment, the decompressor 213b is not stored on the integrated circuit card 101 but is uploaded to the integrated circuit card 101 during personalization 403.

Step 803, performed during the chip-module manufacturing stage 401a: the compressed code libraries 223 are loaded into the NVM of the chip-module 105.

Step 804: Next the manufacturer releases the chip-module 105 to a card manufacturer for integration into card stock, step 817. The card manufacturer then releases the cards to the issuer (e.g., a bank), step 819. The issuer personalizes the cards: personalization stage 403.

Figure 11:
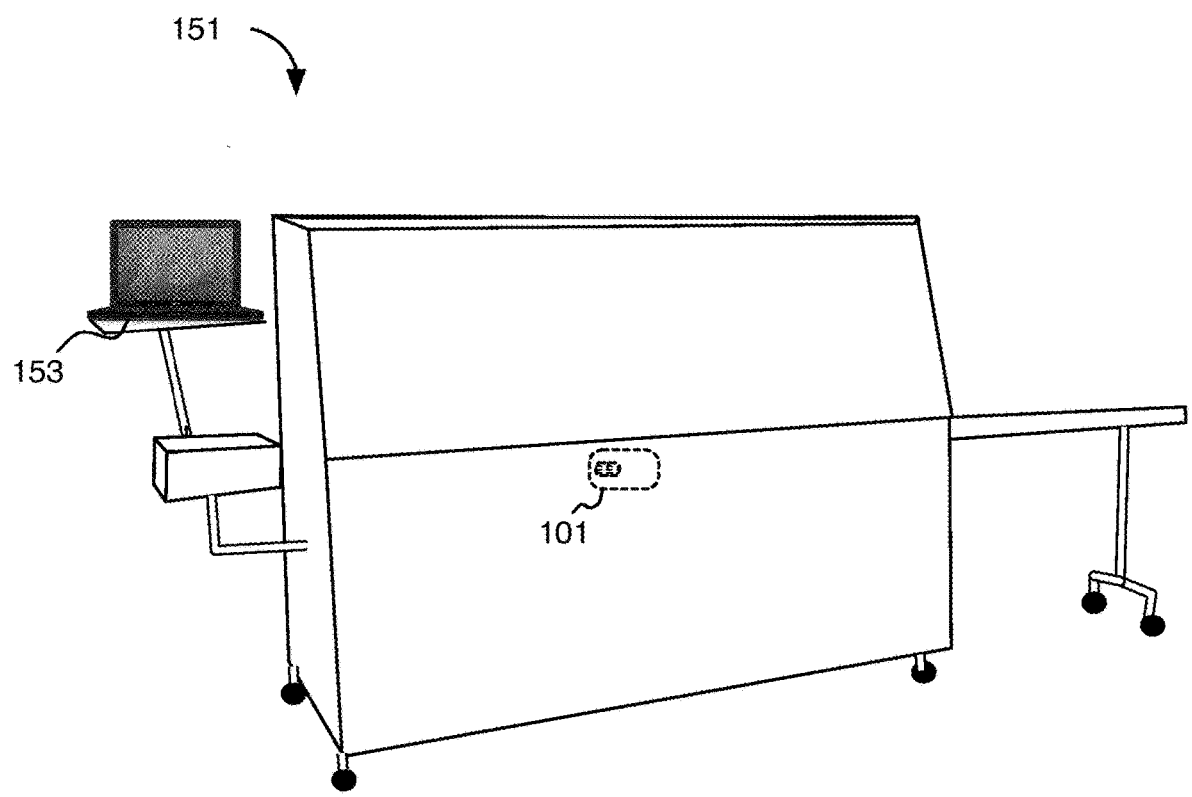
FIG. 11 is an illustration of a personalization machine.

Step 805: the integrated circuit card 101 is entered into a personalization machine (illustrated in FIG. 11).

Step 807: as a card is personalized for a customer, the applications 221 to be loaded onto the card is determined.

Step 809: based on the applications that are determined to be required for a customer, the required corresponding application code libraries 223 are determined.

Step 811: the personalization equipment, having determined which code libraries are required, signals the integrated circuit card 101 which code libraries to decompress and the integrated circuit card 101 decompresses the required code libraries. Specifically, the processor 301 executes instructions of the decompressor 213b to decompress the compressed code libraries 227 into decompressed code libraries 229 (FIG. 10).

Step 813: the personalization equipment also signals the integrated circuit card 101 to delete compressed code libraries 227. The deletion of compressed code libraries 227 includes deleting the compressed versions of the code libraries that have been decompressed. The deletion may also be implicit in that the decompressed code libraries 229 may be written into space used to store compressed code libraries 227.

Step 815: Finally, the decompressor 213b may be deleted. Thus, the personalization equipment transmits an instruction to the integrated circuit card 101 to delete the decompressor 213b.

Figure 10:
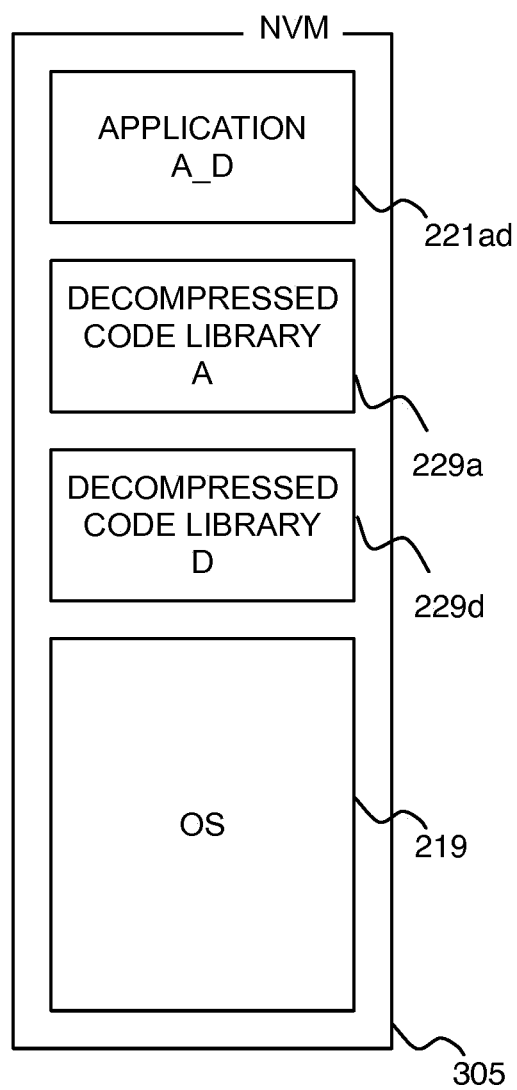
FIG. 10 is a block diagram illustrating an example of the contents of the non-volatile memory of an integrated circuit card after the personalization stage in which compressed code libraries are replaced with decompressed code libraries.

FIG. 10 is an example of the contents of the NVM 305 after the personalization process 403. Consider an application A_D 221ad that uses two application code libraries 221a and 221d. The personalization equipment directs the integrated circuit card 101 to decompress the compressed application code libraries 227a and 227d. The resulting decompressed application code libraries 229a and 229d are stored in the NVM 305. As the compression and decompression should be lossless, the decompressed application code libraries 229 should be exact duplicates of the corresponding original application code libraries 223.

The method described hereinabove is advantageously performed by a personalization machine in conjunction with a manufacturing machine. FIG. 11 is a schematic illustration of a personalization machine 151. The personalization machine 151 receives the integrated circuit card 101 blanks from the manufacturer. The blanks contain in NVM 305 the compressed application code libraries 227. The personalization machine 151 is controlled by a computer 153. The computer 153 has internal storage means for storing computer programs used during personalization. These computer programs include instructions to receive personalization parameters for specific integrated circuit cards 101 that are processed by the personalization machine 151. Such personalization parameters include the specification of applications to be loaded onto a specific integrated circuit card 101 and instructions to communicate with the integrated circuit card 101 as it is being personalized.

Figure 12:
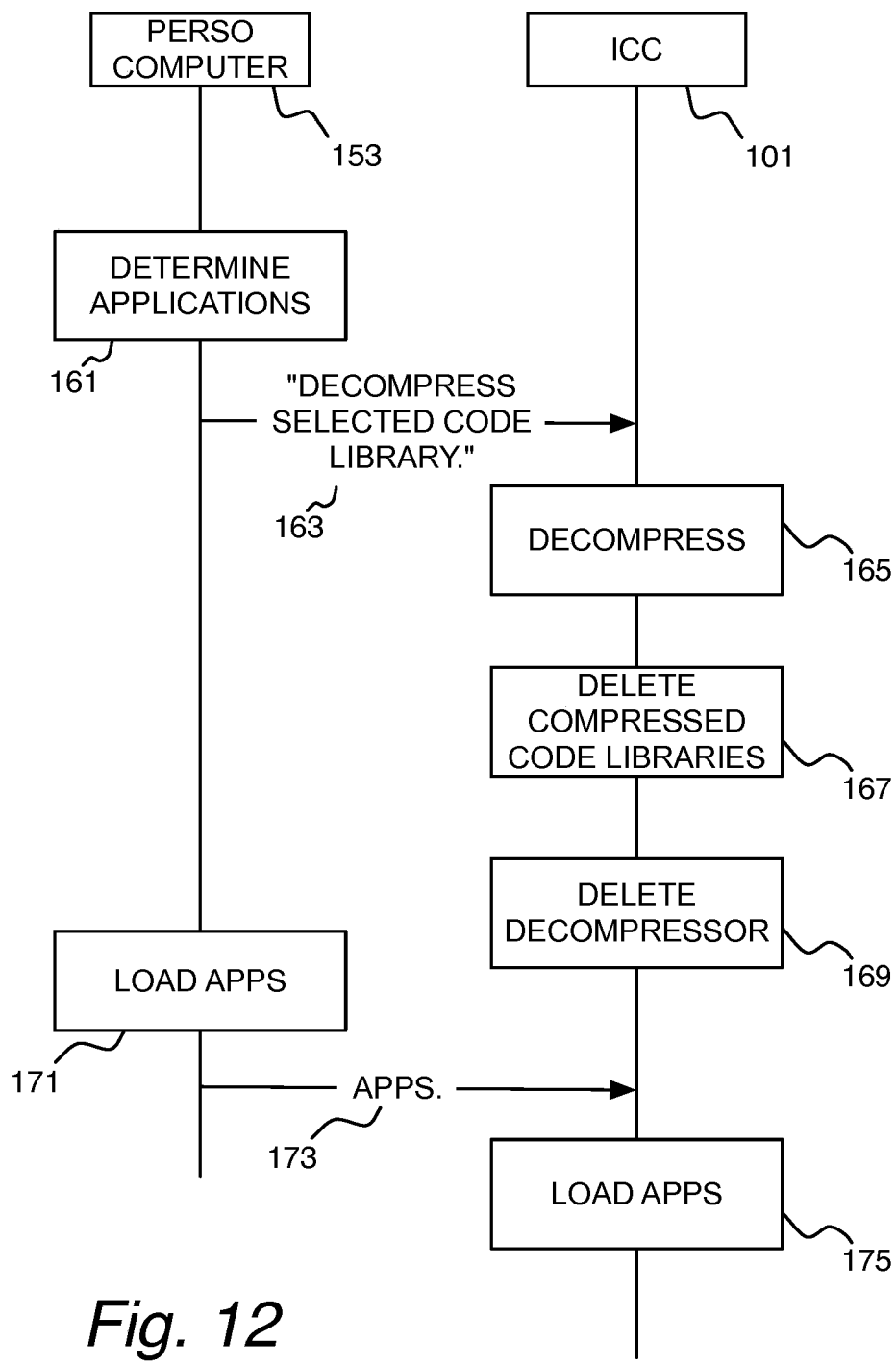
FIG. 12 is a timing-sequence diagram illustrating message flow between a computer of the personalization machine of FIG. 11 and an integrated circuit card being personalized therein.

FIG. 12 is a timing sequence diagram illustrating message flow between the personalization computer 153 and an integrated circuit card 101 being personalized. The perso computer 153 determines the applications that pertain to the specific integrated circuit card 101 being personalized, step 161.

The personalization computer 153 transmits a list of code libraries to be decompressed. Typically, if the integrated circuit card 101 will only be used with one application, e.g., it is a VISA card and not an American Express. MasterCard, or JCB card, the list will only contain one code library, namely, the code library corresponding to the The card decompresses the pertinent application code libraries, step 165, and cleans up the NVM 305 by deleting the compressed code libraries, step 167, and the decompressor, step 169.

The personalization computer 153 loads the application program(s) 221, step 171, and transmits the application program(s) 221 to the integrated circuit card 101, step 173. The integrated circuit card 101 receives the application(s) 221 and loads these into the NVM 305, step 175.

While the present technology has been described herein in the context of integrated circuit cards, the technology is applicable to other devices that are personalizable and which have constraints on memory size, for example, devices with non-volatile memory such as flash memory or EEPROM for program and data storage.

From the foregoing it is apparent that a technology is described which allows for distribution of multiple application code libraries on one integrated circuit card family that supports multiple applications thereby obviating the necessity for having multiple integrated circuit card families that support different applications. The hereinabove described technology provides for significant cost savings for manufacturers and card issuers alike in that one card family may support many more applications; perhaps all applications provided by an issuer thereby removing the need for maintaining and inventorying multiple card families.

Although specific embodiments of the invention have been described and illustrated, the invention is not to be limited to the specific forms or arrangements of parts so described and illustrated. For example, many of the manufacturing steps are described hereinabove as part of particular stages of an integrated circuit card life cycle. A person skilled in the art would appreciate that many alternative scenarios are possible that all utilize the basic technology described herein. The invention is limited only by the claims.

The invention claimed is:

1. A method for readying a personalizable portable electronic device having a reprogrammable non-volatile memory for storage of application programs and libraries for the loading of at least one application, the non-volatile memory having a plurality of compressed application code libraries in the non-volatile memory, the method comprising:

determining, by a personalisation machine having a computer and a connection to a personalizable portable electronic device having a processor, which of the plurality of application code libraries are required for the at least one application to be loaded on the personalizable portable electronic device;

transmitting from the personalization machine to the portable electronic device a message informing the portable electronic device which application code libraries have been determined to be required by the at least one application to be loaded on the personalizable portable electronic device;

receiving by the portable electronic device the message informing the portable electronic device which application code libraries have been determined to be required by the at least one application used on the personalizable portable electronic device;

in response to receiving the message informing the personalizable portable electronic device which code libraries have been determined to be required, deleting, by the portable device, from the non-volatile memory any compressed application code libraries not indicated to be determined to be required for the at least one application to be loaded on the personalizable portable electronic device; and decompressing, by the personalizable portable device, each application code library determined to be required by the at least one application to be loaded on the personalizable portable electronic device.

2. The method of readying a personalizable portable electronic device having a reprogrammable non-volatile memory for storage of application programs and libraries of claim 1 for the loading of at least one application, the non-volatile memory having a plurality of compressed application code libraries in the non-volatile memory, further comprising:

deleting a decompression program used to decompress an application code library from the non-volatile memory subsequent to the step of decompressing an application code library.

3. The method of readying a personalizable portable electronic device having a reprogrammable non-volatile memory for storage of application programs and libraries of claim 1 for the loading of at least one application, the non-volatile memory having a plurality of compressed application code libraries in the non-volatile memory wherein in the non-volatile memory is a flash memory.

4. The method of readying a personalizable portable electronic device having a reprogrammable non-volatile memory for storage of application programs and libraries of claim 1 for the loading of at least one application, the non-volatile memory having a plurality of compressed application code libraries in the non-volatile memory further comprising compressing the application code libraries external to the portable electronic device prior to storing the plurality of compressed application code libraries in the non-volatile memory.

5. The method of readying a personalizable portable electronic device having a reprogrammable non-volatile memory for storage of application programs and libraries of claim 4 for the loading of at least one application, the non-volatile memory having a plurality of compressed application code libraries in the non-volatile memory.

6. The method of readying a personalizable portable electronic device having a reprogrammable non-volatile memory for storage of application programs and libraries of claim 1 for the loading of at least one application, the non-volatile memory having a plurality of compressed application code libraries in the non-volatile memory wherein the electronic device is a smart card.

* * * * *